United States Patent Office 3,559,384
Patented Feb. 2, 1971

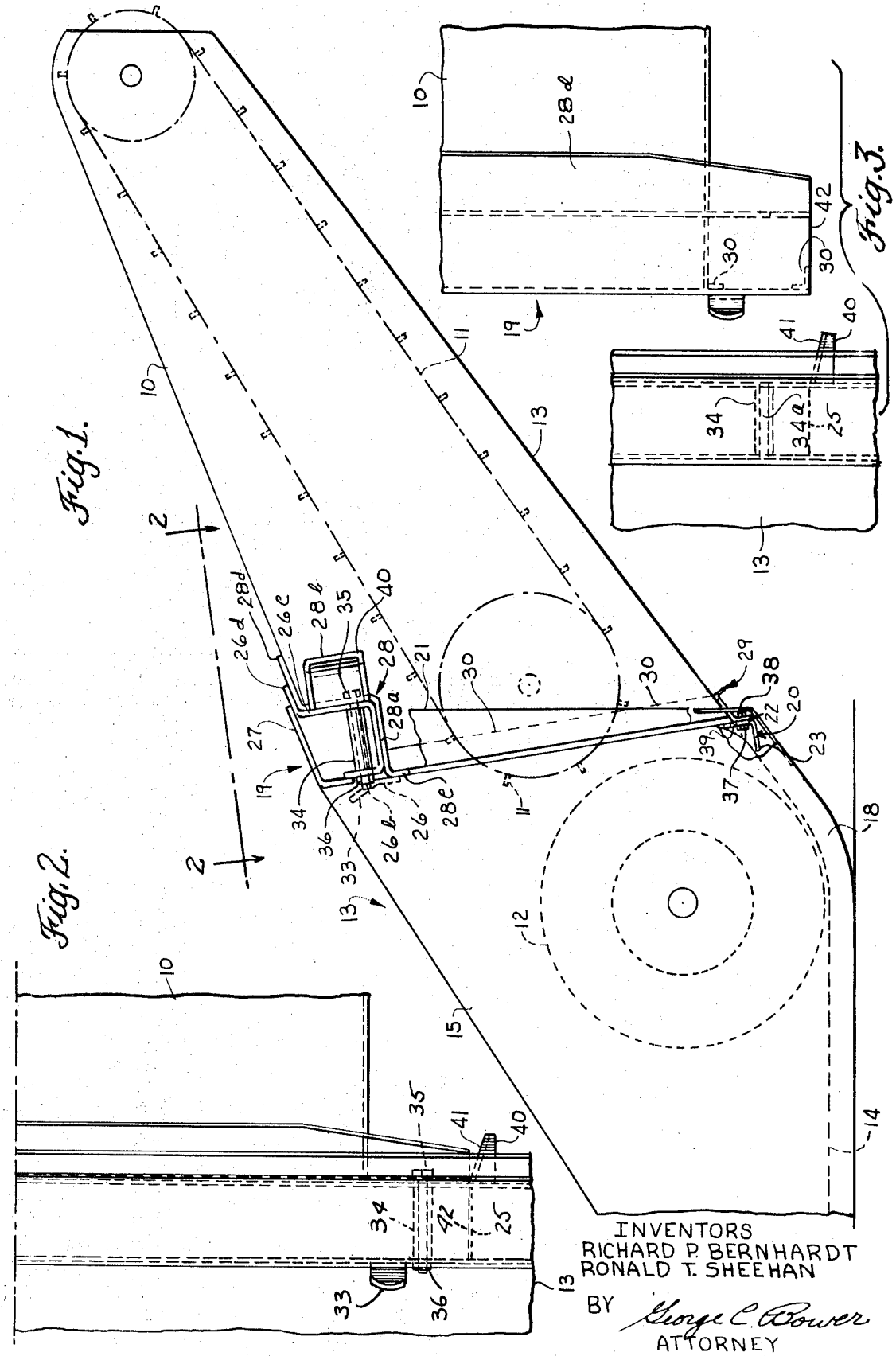

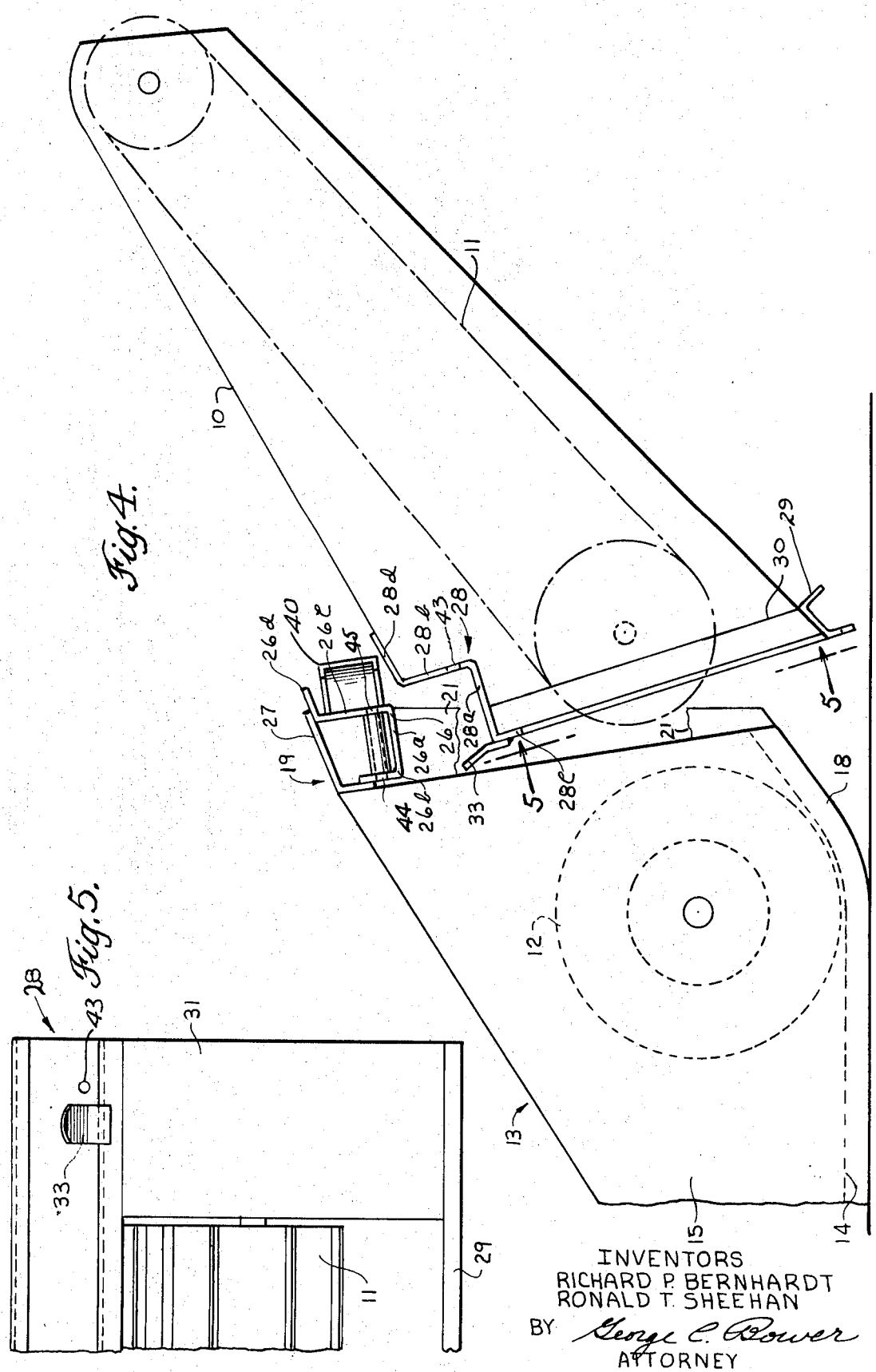

3,559,384
ATTACHING MEANS FOR MOUNTING A HEADER ON THE FEEDER HOUSING OF A COMBINE
Richard P. Bernhardt, Leola, and Ronald T. Sheehan, Lancaster, Pa., assignors to Sperry Rand Corporation, New Holland, Pa., a corporation of Delaware
Filed June 5, 1969, Ser. No. 830,666
Int. Cl. H01d 41/06
U.S. Cl. 56—20                                       9 Claims

ABSTRACT OF THE DISCLOSURE

The feeder housing of a combine and the harvesting header carried by the combine have attaching means comprising a generally L-shaped beam at the top front of the feeder housing and a U-shaped beam at the bottom front. Brackets are transversely spaced on the upper beam and receive the upper header beam for lifting and holding the header. The lower beam of the header engages the U-shaped beam on the feeder housing. The header has angulated plates projecting towards the feeder housing and engaging the ends of the L-shaped beam to align the feeder housing with the header. Bolts extend through the upper beams and the lower beams and have nuts for fastening the header to the feeder housing.

BACKGROUND OF THE INVENTION

This invention relates to means for attaching and detaching a feeder housing of a combine to a header by a horizontal vertical movement of the feeder housing.

There are several different means for coupling the decoupling headers from the feeder housing of a combine. These means are complex and expensive and further require specially shaped metal pieces and parts. The purpose of this invention is to provide attaching and detaching means that utilize sheet metal parts easily formed to the desired shape held together by standard fastening means.

OBJECTS AND SUMMARY OF THE INVENTION

An object of this invention is to provide a quick attachment and quick detachment means for mounting headers on feeder housings of combines by vertical movement of the feeder housing that is inexpensive and easy to manufacture.

Another object of this invention is to provide a quick attachment and detachment of header by movement of the feeder housing that utilizes sheet metal pieces and standard connecting means.

Another object of this invention is to provide means for attaching a header and a combine feeder housing without substantial change to the header or the feeder housing.

Another object of this invention is to provide a quick connect and quick disconnect attaching means that automatically aligns the header with the feeder housing.

In summary the attaching means comprises on a feeder housing an upper generally L-shaped beam with bracket means for receiving an upper generally U-shaped beam on a header with the U-shaped beam having guide means engaging the ends of the upper beam of the housing to transversely align the header and housing and including engaging lower beams on the header and housing to cooperate with the upper beams in positioning the header and fastening means for securing the header and housing together.

Other and further objects and advantages will be apparent from the following description and claims taken in connection with the accompanying drawings which illustrate various features of the invention.

BRIEF DESCRIPTION OF THE DRAWINGS

FIG. 1 is a side view of a header connected to the feeder housing of a combine by the attaching means.

FIG. 2 is a fragmentary top view of the attaching means connecting the header to the feeder housing in the direction indicated by arrows 2—2 of FIG. 1.

FIG. 3 is a fragmentary top view of the header and feeder housing separated.

FIG. 4 is a side view of the header and feeder housing just before connection or after separation of the feeder housing from the header.

FIG. 5 is a front view of the feeder housing.

DETAILED DESCRIPTION OF PREFERRED EMBODIMENT

Referring to FIGS. 1 and 4 the feeder housing 10 is conventionally made of sheet metal and has a crop conveyor or straw elevator 11 for feeding the cut crops received from the auger 12 in the header 13 to the thresher of a combine (not shown). The feeder housing 10 is pivotally mounted at the upper end on the combine to rotate about a horizontal axis. Hydraulic means (not shown) raise and lower the feeder housing so that the front end of the housing swings vertically for picking up, depositing or positioning the header for harvesting.

The header 13 has a bottom wall 14 and end walls 15 spaced at opposite ends of the header. The bottom wall 14 is supported by longitudinally extending beams 18 curved slightly upward at the rear and by a lower transverse beam 20. An upper beam 19 extends across the upper end of the header. The lower beam 20 is welded to the bottom wall 14 and longitudinal beams 18. Vertical rear beams 21 extend between the upper and lower rear beams. Angled gusset plates 24 interconnect and are welded to the beams 18 and 21.

The lower beam 20 is L-shaped with a short vertical side 22 and a wider horizontal side 23 (FIG. 1). The longitudinal beams 18 terminate at and are welded to the horizontal side 23 and the vertical beams 21 are welded to the vertical side 22.

Between the intermediate vertical beams 21 there is an opening 25 (FIG. 2) in the header for passing crops from the auger 12 through the opening 31 into the feeder housing 10. The straw elevator 11 projects through the two openings 25 and 31.

The upper header beam 19 is formed by two sheet metal pieces 26, 27 welded together. The lower piece 26 is generally U-shaped and has a bottom wall 26a and a forward narrow side 26b and a rear wider side 26c. A strip 26d extends along the upper edge at a slight obtuse angle. The upper piece 27 is generally L-shaped and is welded to the short side 26b and the rear strip 26d to impart a generally square cross section to the upper beam.

The feeder housing 10 has an upper L-shaped beam 28 and a lower U-shaped beam 29 extending transversely across the front of the feeder housing. Vertical angle beams 30 are on each side of the housing and have forwardly facing plates 31 (FIG. 5) welded thereto. These facing plates close the portions of the header rear opening 25 extending transversely beyond the sides of the feeder housing. The upper beam 28 has a generally horizontal piece 28a and a generally vertical piece 28b. A forward turned edge 28c extends downwardly from the front edge of the piece 28a and overlaps the vertical angle beams 30. A rear strip 28d extends along the top edge of the piece 28b to overlap the top of the feeder housing. Two guide brackets 33 of sheet metal are welded to the forward turned edge 28c and are bent slightly forward to guide the header upper beam 19 into the space between the brackets and the vertical piece 28b of the beam. The bottom wall 26a of the header upper beam 19 sets on the wall or horizontal piece 28a of the feeder housing. The vertical side 22 of the lower header 20 beam presses against the lower U-shaped beam 29 of the housing.

The header upper beam 19 has two sleeves 34 with bores 34a (FIG. 3) extending between the front and rear sides 26b, 26c. The sides have holes 44, 45 (FIG. 4) as well as the housing upper beams has holes 43 axially aligned with the respective bores 34a of a respective sleeve and holes 37, 38. Bolts 35 and nuts 36 (FIG. 2) pass therethrough securely fasten the two upper beams together. The lower beams 20, 29 are also fastened together by nuts 37 and bolts 38. Slots 39 in the lower beam 20 render the nuts 44 accessible. The nuts and bolts may be omitted. The header beam 19 will then rest against the guide brackets 33 and the lower beam 20 bear against the lower feeder beam 29.

For transverse alignment of the feeder housing the header upper beam 19 has guides 40 with vertical facing sloped surfaces 41 in diverging relation towards the feeder housing or converging in a forward direction. The guides 40 are spaced apart the transverse length of the upper beam 28 on the housing. The surfaces 41 on the guides engage the ends or guide pieces 42 of the upper beam and guide the housing 10 so that the bolt holes in the beams are in alignment with the sleeves and the ends 42 fit within the opening 21 (FIG. 2) of the header. The guides are generally triangularly shaped and have a shallow U-shape for ease of welding to the beam.

The feeder housing 10 can be connected to the header 13 by lowering the feeder housing and moving the guide brackets 33 through the discharge opening 25 in the back of the header and raising the feeder housing so that the beam 28 engages header beam 19. The header will rest against the guide brackets 33.

It is thus seen that a header 13 may be set on the ground or loaded on a trailer and reconnected for harvesting for transportation. The coupling or de-coupling of the header and feeder housing is performed by the combine operator at the operating position on the combine by hydraulic means connected between the feeder housing and combine. The header and feeder housing are aligned transversely by the sloped surfaces 41 engaging the ends of the upper feeder beam. The alignment by the sloped surfaces 41 and the setting of the bottom wall 26a on the horizontal piece 28a aligns the holes and sleeve bores and the holes in the beams 20 and 29 for easy insertion of the bolts. The nuts and bolts are tightened to draw the beam 19 away from the brackets and press the rear side 26c against the vertical piece 28b.

The beam 19 and the beams 28 and 29 with side panels 31 are made of sheet metal and added to the header and feeder housing without any substantial change to the header or housing. The beam is added to the upper rear corner of the header and the beams 28, 29 with panels 31 and beams 30 are fitted around the forward end of the feeder housing. Thus an effective and inexpensive attachment has been attained.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Attachment means for mounting a header with a crop discharge opening on a combine feeder housing defining a feed passage comprising a transverse upper beam with two upwardly extending longitudinally spaced sides and a lower beam on said header above and below said opening, respectively; an upper generally L-shaped beam having a horizontal portion and a vertical portion extending transversely across the top front of said feeder housing and a beam extending transversely across the bottom of said feeder housing; bracket means rigidly attached vertically to said horizontal portion and spaced forwardly from said vertical portion to receive said upper beam of said header with the two sides between said brackets and vertical portions to interconnect said header and feeder housing for supporting said header on said feeder housing with said upper header beam resting on said upper feeder housing beam and said lower header beam bearing against said lower feeder housing beam.

2. Attachment means as set forth in claim 1, wherein upper fastening means are provided for securing said upper beams together and holding said header beam against said vertical portion of said upper feeder housing beam.

3. Attachment means as set forth in claim 2 wherein lower attaching means are provided for securely fastening said lower beams together.

4. Attachment means as set forth in claim 1 wherein said L-shaped upper beam has a forward turned edge extending along said horizontal portion of said L-shaped beam forwardly spaced from said vertical portion and said brackets are mounted on said turned edge and extending on the same side of said horizontal portion as said vertical portion.

5. Attachment means as set forth in claim 1 wherein guide means are provided on said header and feeder housing for positioning said header opening and said feeder passage in a given relation.

6. Attachment means as set forth in claim 5 wherein said guide means comprise guides on said upper header beam extending rearwardly and members on said feeder housing, said guides and members being in a forwardly converging relation.

7. Attachment means as set forth in claim 6 wherein said guides have sloped surfaces facing one another and converging forwardly.

8. Attachment means as set forth in claim 7 wherein said upper feeder housing beam has opposite ends forming said members.

9. Attachment means for mounting a header with a rear crop discharge opening on a combine feeder housing of a generally rectangular cross section defining a feed passage comprising an upper generally rectangular beam and a lower beam on said header above and below said opening, respectively; said upper header beam having a bottom wall and forward and rear side walls; an upper L-shaped beam on said feed housing and a lower beam on the bottom of said housing, said L-shaped beam having a horizontal portion and a vertical portion extending transversely across the top front of said housing and having transversely spaced pieces; guides on said upper header beam having forwardly converging facing surfaces engaging said spaced feeder housing pieces for positioning said opening and passage in a given relation; transversely spaced brackets rigidly attached to said horizontal portion and extending vertically in forwardly spaced relation spaced relation to said vertical portion to receive said upper header beam to support said header on said feeder housing with said upper header beam on said upper feeder housing beam and said lower header beam bearing against said lower feeder housing beam; and means extending through said vertical portion and said sides of said header beam and through said lower beams to securely fasten said header to said feeder housing in the given relation.

References Cited
UNITED STATES PATENTS

| | | | |
|---|---|---|---|
| 3,270,489 | 9/1966 | Rohweder | 56—21 |
| 3,442,069 | 5/1969 | Butler et al. | 56—20 |
| 3,488,930 | 1/1970 | Gorsler et al. | 56—2 |

ANTONIO F. GUIDA, Primary Examiner